United States Patent
Gu

(10) Patent No.: US 12,205,560 B2
(45) Date of Patent: Jan. 21, 2025

(54) IMAGE CONTROLLER AND SEMICONDUCTOR PACKAGE

(71) Applicant: SAMSUNG DISPLAY CO., LTD., Yongin-si (KR)

(72) Inventor: Bon Seog Gu, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 151 days.

(21) Appl. No.: 17/355,044

(22) Filed: Jun. 22, 2021

(65) Prior Publication Data
US 2022/0028359 A1 Jan. 27, 2022

(30) Foreign Application Priority Data
Jul. 27, 2020 (KR) .......... 10-2020-0093312

(51) Int. Cl.
G09G 3/20 (2006.01)
G01K 7/01 (2006.01)
G09G 5/39 (2006.01)

(52) U.S. Cl.
CPC ............ G09G 5/39 (2013.01); G01K 7/01 (2013.01); G09G 3/20 (2013.01); G09G 2320/041 (2013.01)

(58) Field of Classification Search
CPC .. G01K 7/01; G09G 3/20; G09G 5/39; G09G 3/02
See application file for complete search history.

(56) References Cited

U.S. PATENT DOCUMENTS

| | | | |
|---|---|---|---|
| 8,838,885 B2 | 9/2014 | Kwak et al. | |
| 9,570,147 B2 | 2/2017 | Kim | |
| 9,746,889 B2 | 8/2017 | Mittal et al. | |
| 2005/0151717 A1* | 7/2005 | Seo | H05B 45/18 345/102 |
| 2011/0109596 A1* | 5/2011 | Yoon | H10K 59/126 345/204 |

(Continued)

FOREIGN PATENT DOCUMENTS

EP 2 680 240 3/2018
KR 10-2012-0137051 12/2012

(Continued)

OTHER PUBLICATIONS

Notice of Allowance issued by the Korean Patent Office for Korean Patent Application No. 10-2020-0093312 on Dec. 4, 2024, 6 pages, in Korean.

*Primary Examiner* — Roy P Rabindranath
(74) *Attorney, Agent, or Firm* — F. CHAU & ASSOCIATES, LLC

(57) ABSTRACT

An image controller includes: a first semiconductor circuit configured to generate a third compensation data obtained by applying a first image compensation to an input image data; a second semiconductor circuit configured to generate a first compensation data obtained by applying a second image compensation different from the first image compensation to the input image data; and a sensing unit configured to generate a temperature sensing data by measuring a temperature of the second semiconductor circuit. The first semiconductor circuit determines whether an operation of the second semiconductor circuit is to be off based on the temperature sensing data.

18 Claims, 9 Drawing Sheets

(56) References Cited

U.S. PATENT DOCUMENTS

2016/0203854 A1* 7/2016 Kim .................. H01L 25/18
                                                    365/222
2020/0074906 A1* 3/2020 Lee .................... G09G 3/20
2020/0389508 A1* 12/2020 Hashimoto ......... H04L 65/1069

FOREIGN PATENT DOCUMENTS

| KR | 10-2016-0086607   | 7/2016 |
| KR | 10-2018-0005179   | 1/2018 |
| KR | 10-2020-0042680 A | 4/2020 |
| KR | 10-2020-0046875 A | 5/2020 |
| KR | 10-2020-0067389 A | 6/2020 |

* cited by examiner

IMAGE CONTROLLER AND SEMICONDUCTOR PACKAGE

CROSS-REFERENCE TO RELATED APPLICATION

This U.S. non-provisional patent application claims priority under 35 U.S.C. § 119 to Korean patent application 10-2020-0093312, filed on Jul. 27, 2020, in the Korean Intellectual Property Office (KIPO), the entire disclosure of which is incorporated by reference herein in its entirety.

TECHNICAL FIELD

The present disclosure relates to a semiconductor package, and more particularly, to an image controller and a semiconductor package implementing the image controller.

DISCUSSION OF THE RELATED ART

Display devices having liquid crystal display and organic light emitting display are widely used to disseminate visual media of all types.

A display device may include an image controller and a display panel. The image controller generates image data based on input image data received and the display panel displays an image, based on the image data. Meanwhile, the image controller may generate image data by applying various image compensations to input image data so that display quality of the display device is optimized.

Many applications depend on high-performance display devices, therefore, requirements for operational performance of a semiconductor package for implementing an image controller have recently increased.

SUMMARY

Embodiments of the present inventive concept provide an image controller and a semiconductor package for implementing the image controller, in which an operation of a semiconductor circuit is controlled based on a temperature of the semiconductor circuit, so that a failure caused by excessive heat generated from the semiconductor circuit can be minimized.

According to an embodiment of the inventive concept, an image controller may include: a first semiconductor circuit configured to generate a third compensation data obtained by applying a first image compensation to an input image data; a second semiconductor circuit configured to generate a first compensation data obtained by applying a second image compensation different from the first image compensation to the input image data; and a sensing unit configured to generate a temperature sensing data by measuring a temperature of the second semiconductor circuit, wherein the first semiconductor circuit determines whether an operation of the second semiconductor circuit is to be off based on the temperature sensing data.

In an embodiment of the inventive concept, the first semiconductor circuit may generate an image data, based on the first compensation data and the third compensation data, when the measured temperature of the second semiconductor circuit is lower than a predetermined temperature. The first semiconductor circuit may allow the operation of the second semiconductor circuit to be off, generate a second compensation data obtained by applying the second image compensation to the input image data, and generate the image data, based on the second compensation data and the third compensation data, when the measured temperature of the second semiconductor circuit is equal to or higher than the predetermined temperature.

In an embodiment of the inventive concept, the image controller may further include a memory unit configured to store a compensation parameter corresponding to the second image compensation.

In an embodiment of the inventive concept, the first semiconductor circuit may generate the second compensation data by applying the compensation parameter to the input image data.

In an embodiment of the inventive concept, the first semiconductor circuit may include a compensator configured to generate the third compensation data, based on the input image data, a calculator configured to generate the second compensation data, based on the input image data and the compensation parameter, and a data pass controller configured to generate a first data pass control signal for controlling the calculator and a second data pass control signal for controlling the second semiconductor circuit, based on the temperature sensing data.

In an embodiment of the inventive concept, when the measured temperature of the second semiconductor circuit is equal to or higher than the predetermined temperature, the second semiconductor circuit is prevented from generating the first compensation data, and the calculator may generate the second compensation data, based on the first data pass control signal.

In an embodiment of the inventive concept, the compensator may generate the image data, based on the second compensation data and the third compensation data.

In an embodiment of the inventive concept, when the measured temperature of the second semiconductor circuit is lower than the predetermined temperature, the second semiconductor circuit may generate the first compensation data, based on the second data pass control signal, and the calculator is prevented from generating the second compensation data, based on the first data pass control signal.

In an embodiment of the inventive concept, the compensator may generate the image data, based on the first compensation data and the third compensation data.

In an embodiment of the inventive concept, the compensation parameter stored in the memory unit may be provided from the second semiconductor circuit.

In an embodiment of the inventive concept, the sensing unit may generate the temperature sensing data by further measuring temperatures of the first semiconductor circuit and the memory unit.

In an embodiment of the inventive concept, the first semiconductor circuit may determine whether the operation of the second semiconductor circuit is to be off, based on the measured temperature of the first semiconductor circuit, the measured temperature of the second semiconductor circuit, and the measured temperature of the memory unit.

According to an embodiment of the inventive concept, a semiconductor package may include: a first package including a first semiconductor circuit configured to generate a third compensation data obtained by applying a first image compensation to an input image data; a second package including a second semiconductor circuit configured to generate a first compensation data obtained by applying a second image compensation different from the first image compensation to the input image data, the second package being disposed above the first package; and at least one thermal sensor disposed in a predetermined sensing area on the second semiconductor circuit and configured to measure a temperature of the second semiconductor circuit, wherein the first semiconductor circuit determines whether an operation of the second semiconductor circuit is to be off, based on the temperature of the second semiconductor circuit, which is measured by the at least one thermal sensor.

In an embodiment of the inventive concept, the first semiconductor circuit may generate image data, based on the first compensation data and the third compensation data, when the temperature of the second semiconductor circuit, which is measured by the at least one thermal sensor, is lower than a predetermined temperature. The first semiconductor circuit may allow the operation of the second semiconductor circuit to be off, generate second compensation data obtained by applying the second image compensation to the input image data, and generate the image data, based on the second compensation data and the third compensation data, when the temperature of the second semiconductor circuit, which is measured by the at least one thermal sensor, is equal to or higher than the predetermined temperature.

In an embodiment of the inventive concept, the semiconductor package may further include a third package including a memory configured to store a compensation parameter corresponding to the second image compensation, the third package being disposed above the first package.

In an embodiment of the inventive concept, the first package may further include a first substrate supporting the first semiconductor circuit, the first substrate being electrically connected to the first semiconductor circuit, and the second package may further include a second substrate supporting the second semiconductor circuit, the second substrate being electrically connected to the second semiconductor circuit. The first substrate and the second substrate may be electrically connected to each other through at least one connection member.

In an embodiment of the inventive concept, the first package may further include a first substrate supporting the first semiconductor circuit, the first substrate being electrically connected to the first semiconductor circuit, and the third package may further include a third substrate supporting the memory, the third package being electrically connected to the memory. The first substrate and the third substrate may be electrically connected to each other through at least one connection member.

In an embodiment of the inventive concept, the at least one thermal sensor may be disposed between the second semiconductor circuit and the second substrate.

In an embodiment of the inventive concept, the semiconductor package may further include at least one heat dissipation member disposed on a top surface of at least one of the second package and the third package.

In an embodiment of the inventive concept, a semiconductor package may include a first package including a first semiconductor circuit configured to generate a third compensation data obtained by applying a first image compensation to an input image data, a second package including a second semiconductor circuit configured to generate a first compensation data obtained by applying a second image compensation different from the first image compensation to the input image data, the second package being disposed above the first package, at least one thermal sensor configured to measure a temperature of the second semiconductor circuit, and a third package including a memory configured to store a compensation parameter corresponding to the second image compensation, the third package being disposed above the first package, wherein the third package includes a substrate supporting the memory, and the third package being electrically connected to the memory.

BRIEF DESCRIPTION OF THE DRAWINGS

Example embodiments will be described in greater detail hereinafter with reference to the accompanying drawings. In the accompanying drawings, dimensions may be exaggerated for clarity of illustration. It will be understood that when an element is referred to as being "between" two elements, it may be the only element between the two elements, or one or more intervening elements may also be present between the two elements.

The above and other features of the inventive concept will become more apparent by describing in detail example embodiments thereof with reference to the accompanying drawings, in which.

DETAILED DESCRIPTION OF THE EMBODIMENTS

Figure 1:
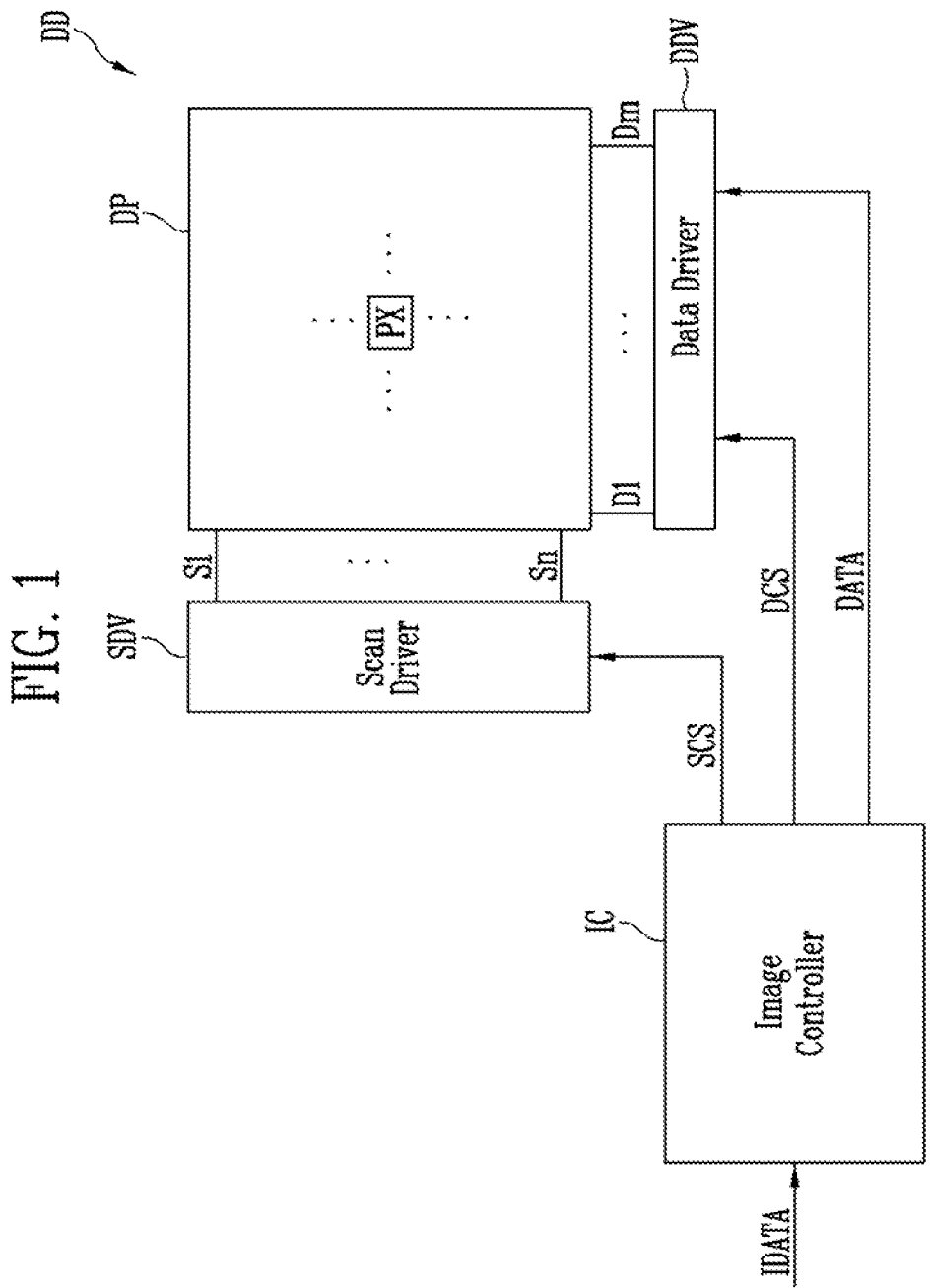
FIG. 1 is a block diagram illustrating a display device in accordance with embodiments of the present disclosure.

Like reference numerals may refer to like elements throughout this specification. In the figures, the thickness of lines, layers, components, or films or regions may be exaggerated for clarity.

The term "and/or" includes any and all combinations of one or more of the associated listed items.

It will be understood that although the terms such as "first" and "second" are used herein to describe various elements, these elements should not be limited by these terms. The terms are only used to distinguish one component from other components. For example, a first element referred to as a first element in one embodiment may be referred to as a second element in another embodiment without departing from the scope of the appended claims. The singular forms, "a", "an" and "the" are intended to include the plural forms as well, unless the context clearly indicates otherwise.

It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof.

Also, "under", "below", "above", "upper", and the like are used for explaining relational association of components or elements illustrated in the drawings. The terms are intended to be a relative concept and are described based on directions as illustrated in the drawings.

Here, it will be understood that when an element or layer is referred to as being "on", "connected", or "coupled to"

another element or layer, it can be directly on, connected or coupled to the another element or layer, or one or more intervening elements may be present.

Hereinafter, example embodiments of the present disclosure will be described in detail with reference to the accompanying drawings.

FIG. 1 is a block diagram illustrating a display device in accordance with embodiments of the present disclosure. Referring to FIG. 1, the display device DD may include a display panel DP, an image controller IC, a scan driver SDV (or scan driving circuit), and a data driver DDV (or data driving circuit).

The display panel DP may include pixels PX. Each pixel PX may be connected to a corresponding data line and a corresponding scan line. Meanwhile, each pixel PX may be supplied with voltages of a first power source and a second power source from the outside. The first power source and the second power source are voltages necessary for an operation of the pixels. For example, the first power source may have a voltage level higher than that of the second power source.

Each of the pixels PX may include a driving transistor and at least one switching transistor. Each of the pixels PX may emit light with a luminance corresponding to a data signal provided through a corresponding data line in response to a scan signal provided through a corresponding scan line.

The image controller IC may receive input image data IDATA and a control signal from the outside. The control signal may include a vertical synchronization signal, a horizontal synchronization signal, a clock signal, a data enable signal, and the like.

The image controller IC may generate a scan control signal SCS and a data control signal DCS, corresponding to the control signal. The scan control signal SCS may be supplied to the scan driver SDV, and the data control signal DCS may be supplied to the data driver DDV.

The image controller IC may generate image data DATA by converting the input image data IDATA. For example, the image controller IC may generate the image data by rearranging the input image data DATA. The image data DATA may be supplied to the data driver DDV.

The scan driver SDV may supply scan signals to the pixels PX through scan lines S1 to Sn in response to the scan control signal SCS. Here, n may be an integer greater than 0.

The data driver DDV may convert the image data in a digital form into a data signal in an analog form and then supply the data signal to the pixels PX through data lines D1 to Dm, in response to the data control signal DCS. Here, m may be an integer greater than 0.

According to an embodiment, the display device DD may correct the input image data IDATA by using the image controller IC to perform an optical compensation, an after-image compensation, an external compensation, etc., and to generate the image data DATA, based on the corrected input image data IDATA. For example, the image controller IC may include physical compensation blocks (e.g., a compensator, etc.) including a compensation IP and the like.

According to an embodiment, to minimize the area of a semiconductor package for implementing the image controller IC, the image controller IC may have a structure in which semiconductor packages for performing different image compensations are vertically stacked.

However, as resolution increases and the display device DD displays an image at a high image refresh rate, driving frequency, or screen refresh rate, a compensation parameter and/or a transmission amount or transmission speed between or in semiconductor circuits included in a semiconductor package for image compensation in the image controller IC increases. Therefore, a failure may occur due to excessive heat generated in a semiconductor circuit in the image controller IC.

The image controller IC (or the display device DD), according to some embodiments of the present disclosure, may sense or measure a temperature of a semiconductor circuit, allow an operation of the corresponding semiconductor circuit to be off when the sensed temperature is equal to or higher than a predetermined temperature, and compensate for the input image data IDATA by using a memory for temporarily processing the compensation parameter, such that a failure caused by excessive heat generated in a semiconductor circuit in the image controller IC can be minimized.

Figure 2:
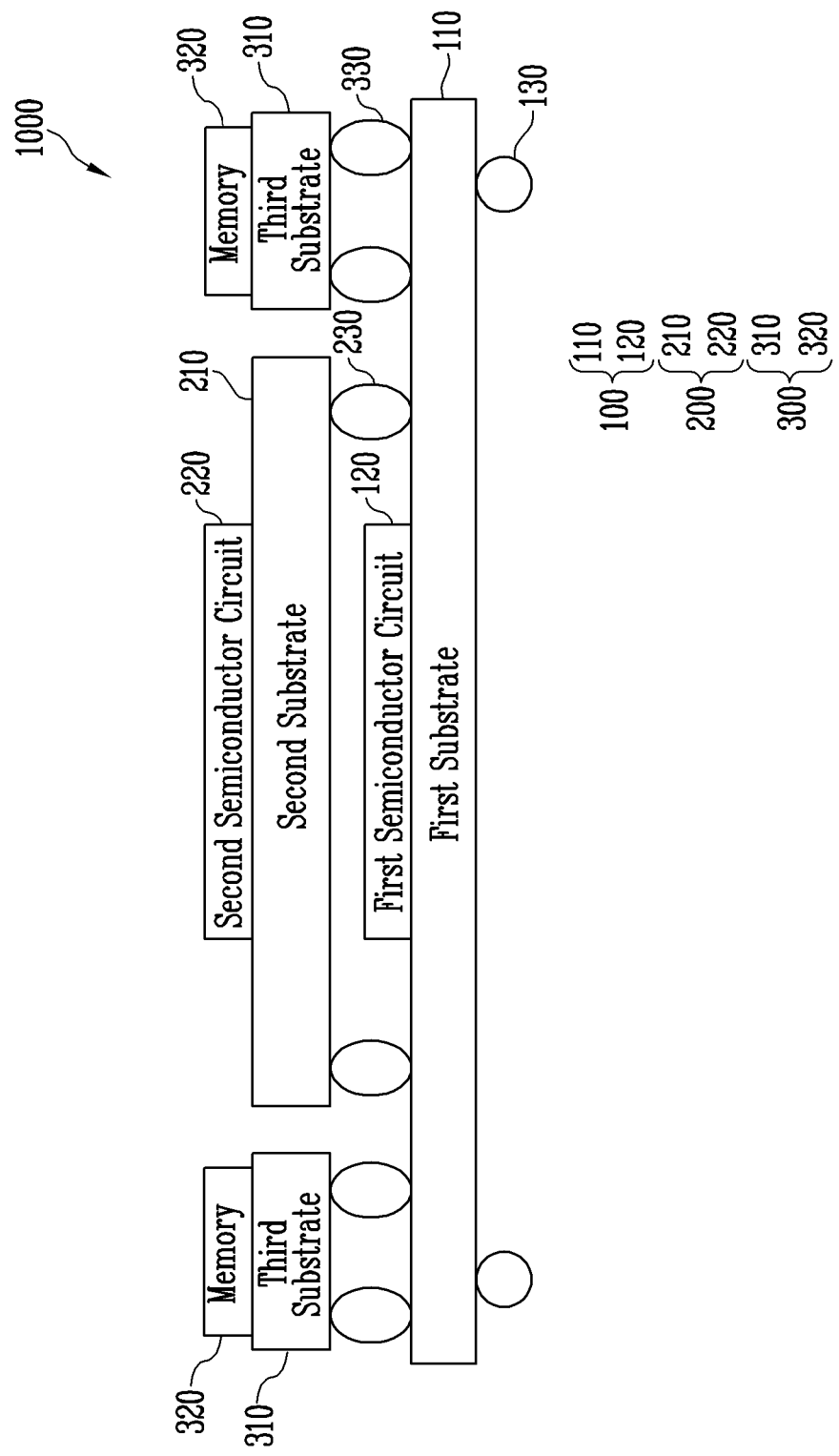
FIG. 2 is a diagram illustrating a semiconductor package in accordance with embodiments of the present disclosure.
Figure 3A:
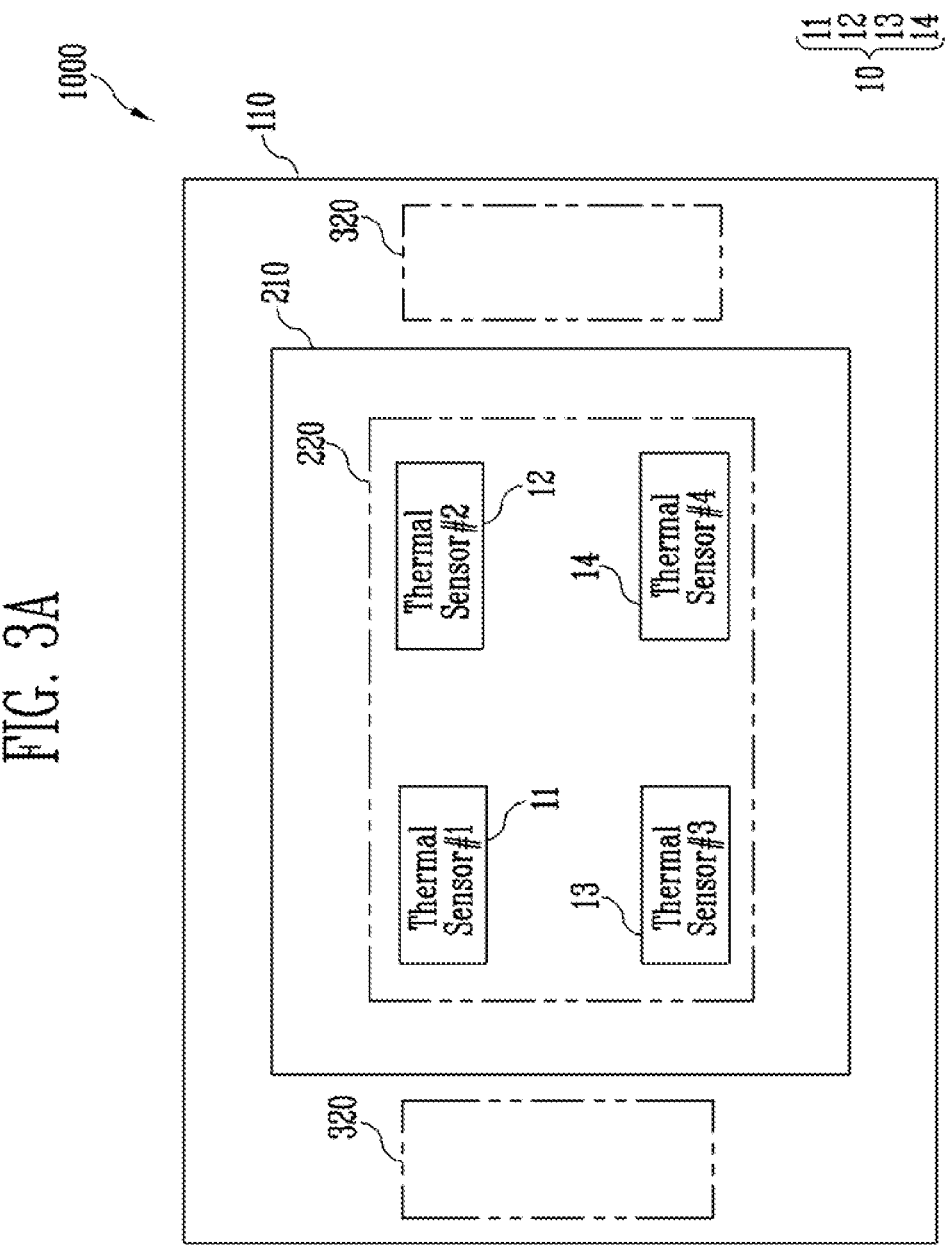
FIGS. 3A and 3B are diagrams illustrating thermal sensors included in the semiconductor package shown in FIG. 2.
Figure 3B:
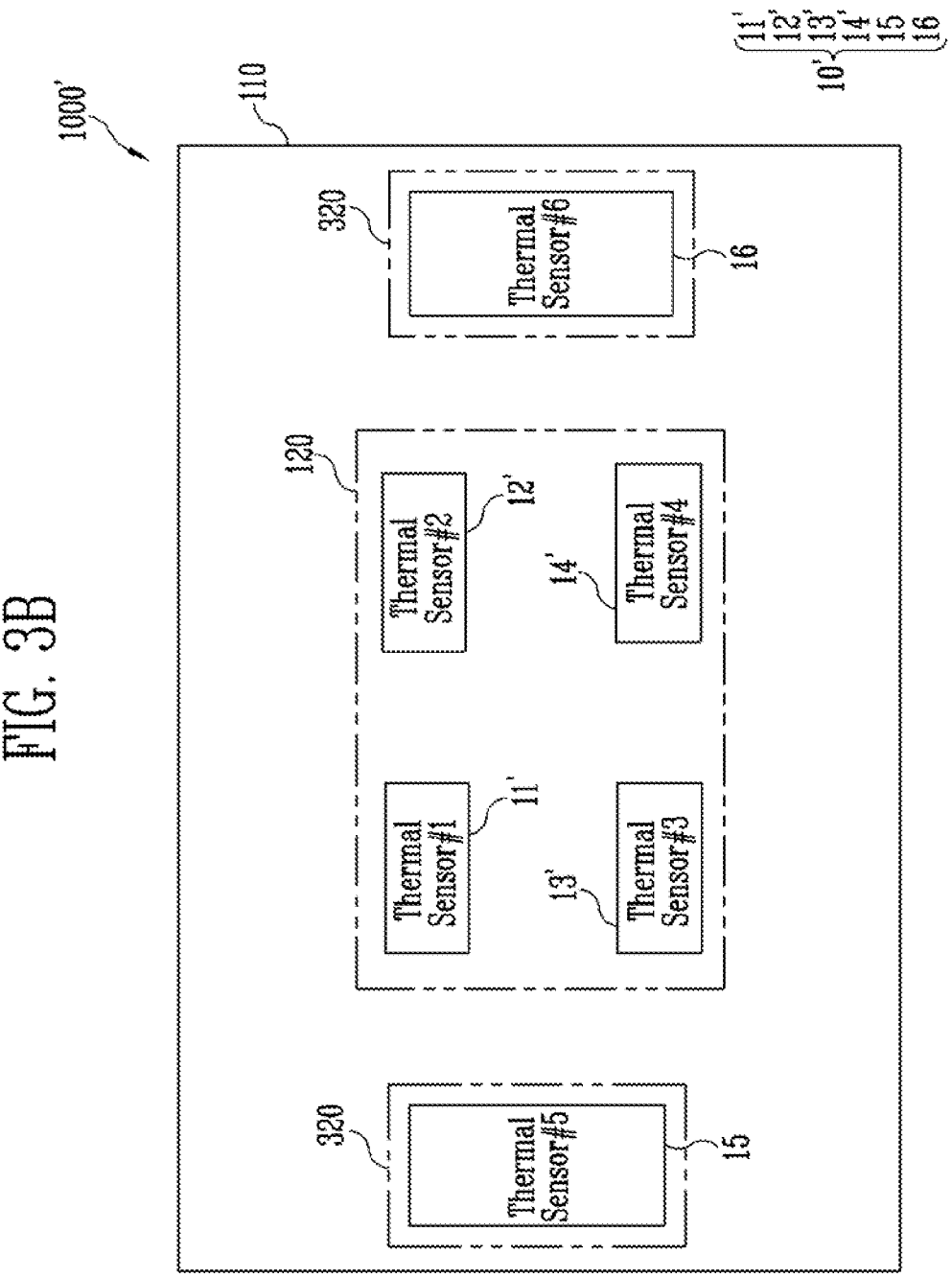

FIG. 2 is a diagram illustrating a semiconductor package in accordance with embodiments of the present disclosure. FIGS. 3A and 3B are diagrams illustrating thermal sensors included in the semiconductor package shown in FIG. 2. In some embodiments, the image controller IC may be implemented with the semiconductor package 1000 shown in FIG. 2.

Referring to FIGS. 1 and 2, the semiconductor package 1000 may include a first package 100 including a first semiconductor circuit 120 and a second package 200 including a second semiconductor circuit 220. The semiconductor package 1000 may have a Package on Package (PoP) structure as a structure in which the second package 200 is formed above the first package 100. As described above, according to the PoP structure, the area of the semiconductor package 1000 can be minimized.

In an embodiment of the inventive concept, the semiconductor package 1000 may further include a third package 300 which is formed above the first package 100 and includes a memory 320. The third package 300 may be formed at one side of the second package 200. In one example, two third packages 300 are formed above the first package 100 is illustrated in FIG. 2, this is merely an example and embodiments of the inventive concept are not limited thereto, and one or three or more third packages 300 may be formed above the first package 100.

The first package 100 may include a first substrate 110 and the first semiconductor circuit 120 which may be formed on the first substrate 110. The first semiconductor circuit 120 may be implemented with a logic chip. For example, the first semiconductor circuit 120 may be implemented as a system semiconductor with an Application Specific Integrated Circuit (ASIC), an Application Specific Standard Part (ASSP), or the like.

The first substrate 110 may be electrically connected to an external board such as a main board through external connection members 130.

The second package 200 may include a second substrate 210 formed above the first package 100 and the second semiconductor circuit 220 formed on the second substrate 210. The second semiconductor circuit 220 may be implemented with a logic chip.

The second substrate 210 may be electrically connected to the first substrate 110 through first connection members 230.

The third package 300 may include a third substrate 310 formed above the first package 100 and the memory 320 formed on the third substrate 310. For example, the memory 320 may be a memory chip such as a Dynamic Random Access Memory (DRAM). Also, the memory 320 may be a Double Data Rate Synchronous Dynamic Random Access Memory (DDR SDRAM) chip (or DDR chip).

The third substrate 310 may be electrically connected to the first substrate 110 through second connection members 330.

According to an embodiment of the inventive concept, the memory 320 may be formed on the third substrate 310 as illustrated in FIG. 2. However, this is merely an example embodiment and embodiments of the inventive concept are not limited thereto. For example, the arrangement of the memory 320 may vary. The memory 320 may be formed on the first substrate 110 or may be formed on the second substrate 210.

In some embodiments, the semiconductor package 1000 may sense or measure a temperature of the second semiconductor circuit 220 by using a thermal sensor.

The thermal sensor included in the semiconductor package 1000 will be described in greater detail with reference to FIG. 3A. The semiconductor package 1000 may include a sensing unit 10 including thermal sensors 11, 12, 13, and 14.

The thermal sensors 11, 12, 13, and 14 may be disposed in plurality between the second substrate 210 and the second semiconductor circuit 220, to sense or measure a temperature of the second semiconductor circuit 220. In addition, the thermal sensors 11, 12, 13, and 14 may be respectively disposed in predetermined sensing areas between the second substrate 210 and the second semiconductor circuit 220. Accordingly, the thermal sensors 11, 12, 13, and 14 may be disposed on the top of the second substrate 210, to sense or measure a temperature due to heat generation for each sensing area.

However, the arrangement of the thermal sensors 11, 12, 13, and 14 is not limited thereto. For example, the thermal sensors 11, 12, 13, and 14 may be directly disposed on the top of the second semiconductor circuit 220.

In addition, the number of the thermal sensors 11, 12, 13, and 14 is not limited to four thermal sensors. For example, the sensing unit 10 may include one, two, three, or five or more thermal sensors according to a sensing area set in the second semiconductor circuit 220.

Due to an increase in resolution and an increase in image refresh rate, in the example structure of the semiconductor package 1000, heat generation between the first package 100 and the second package 200 may increase and become challenging. For example, heat generation between the first package 100 and the second semiconductor circuit 220 of the second package 200 may increase and become challenging.

According to an embodiment of the inventive concept, when the temperature of the second semiconductor circuit 220 is equal to or higher than a predetermined temperature, the semiconductor package 1000 (or the image controller IC) may allow an operation of the second semiconductor circuit 220 to be off (e.g., switched to off position), and the semiconductor package 1000 may perform a compensation operation of the second semiconductor circuit 220 in the first semiconductor circuit 120 by using a compensation parameter stored in the memory 320.

In some embodiments of the inventive concept, the semiconductor package 1000 may sense or measure a temperature of the first semiconductor circuit 120 and/or the memory 320, in addition to the second semiconductor circuit 220. This will be described in greater detail with reference to FIG. 3B.

Referring to FIG. 3B, a semiconductor package 1000' may sense or measure a temperature of the first semiconductor circuit 120 and/or the memory 320 using a thermal sensor. The semiconductor package 1000' may include a sensing unit 10'. The sensing unit 10' may include a set of thermal sensors including thermal sensors 11', 12', 13', 14', 15 and 16. In some embodiments, the image controller IC may be implemented with the semiconductor package 1000'.

According to an embodiment of the inventive concept, as shown in FIG. 3B, one or more thermal sensors (e.g., thermal sensors 11', 12', 13', and 14') of a sensing unit 10' may be disposed between the first substrate 110 and the first semiconductor circuit 120 for each sensing area of the first semiconductor circuit 120 or the one or more thermal sensors may be directly disposed on the first semiconductor circuit 120, to sense or measure a temperature of the first semiconductor circuit 120. Also, one or more thermal sensors (e.g., thermal sensors 15 and 16) of the sensing unit 10' may be disposed between the third substrate 310 and the memory 320 for each sensing area of the memory 320 or be directly disposed on the memory 320, to sense or measure a temperature of the memory 320.

The semiconductor package 1000' (or the image controller IC), according to some embodiments of the inventive concept, may determine whether the operation of the second semiconductor circuit 220 is to be off, by considering the temperatures of the first semiconductor circuit 120 and the memory 320, in addition to the temperature of the second semiconductor circuit 220.

Figure 4:
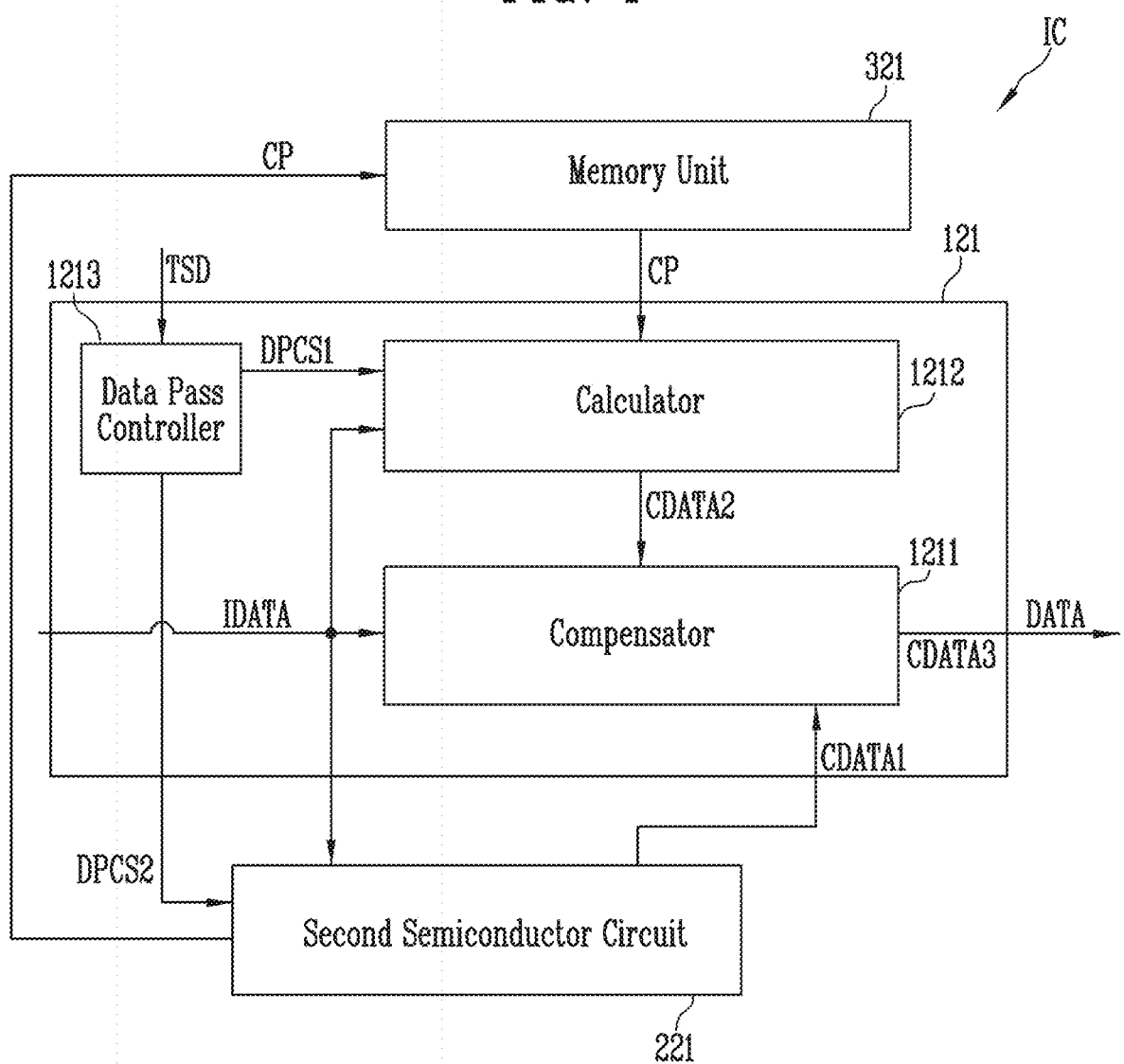
FIG. 4 is a block diagram illustrating an image controller in accordance with embodiments of the present disclosure.
Figure 5A:
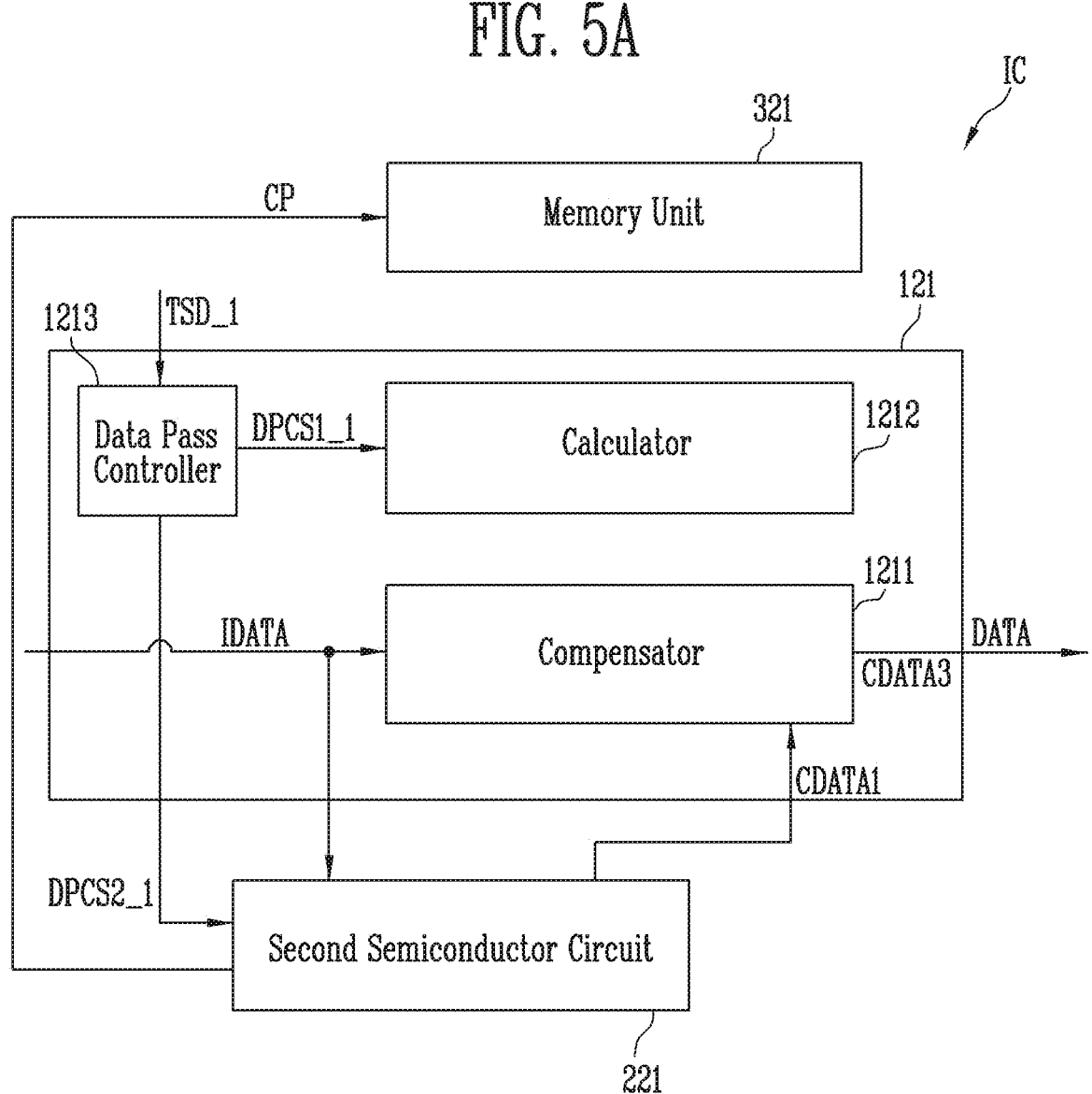
FIGS. 5A and 5B are diagrams illustrating examples of an operation of the image controller shown in FIG. 4.
Figure 5B:
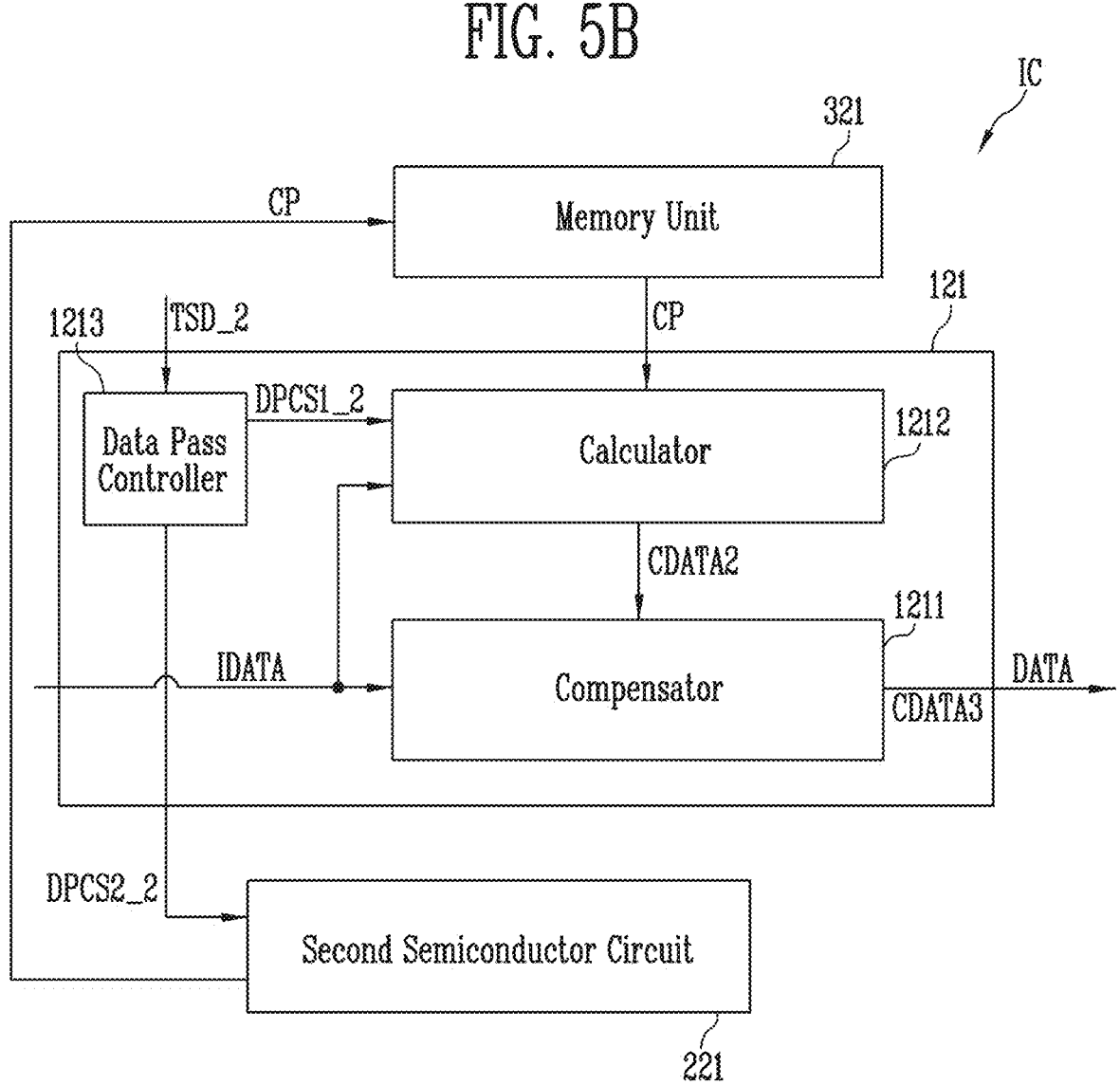

FIG. 4 is a block diagram illustrating an image controller in accordance with embodiments of the present disclosure. FIGS. 5A and 5B are diagrams illustrating examples of an operation of the image controller shown in FIG. 4.

Referring to FIGS. 2, 3A, and 4, the image controller IC may include a first semiconductor circuit 121, a second semiconductor circuit 221, and a memory unit 321. In some embodiments, the image controller IC shown in FIG. 4 may be implemented with the semiconductor package 1000 shown in FIG. 2. For example, the first semiconductor circuit 121 may be implemented with the first package 100 (or the first semiconductor circuit 120), the second semiconductor circuit 221 may be implemented with the second package 200 (or the second semiconductor circuit 220), and the memory unit 321 may be implemented with the third package 300 (or the memory 320).

The image controller IC may receive input image data IDATA, correct the input image data IDATA by performing an image compensation including an optical compensation, an afterimage compensation, an external compensation, etc., and generate image data DATA, based on the corrected input image data IDATA. Embodiments of the inventive concept are not limited to the image compensation described above. For example, the image controller IC may perform another different image compensation.

The image compensation may be performed in the first semiconductor circuit 121 and the second semiconductor circuit 221, and the first semiconductor circuit 121. The second semiconductor circuit 221 may perform different image compensations. According to an embodiment of the inventive concept, an image compensation (hereinafter, referred to as a second image compensation) apart from the image compensation (hereinafter, referred to as a first image compensation) performed by the first semiconductor circuit 121 may be performed in the second semiconductor circuit 221. For example, the second semiconductor circuit 221 may perform the second image compensation including the optical compensation, the external compensation, etc., and the first semiconductor circuit 121 may perform the first image compensation which the second semiconductor circuit 221 does not perform among the image compensations that are performed by the image controller IC.

According to an embodiment of the inventive concept, the second image compensation may be a relatively simple image compensation using a calculation method of adding or subtracting a parameter value to be compensated with respect to the input image data IDATA. For example, the input image data IDATA may not be the same as the corrected input image data IDATA.

The second semiconductor circuit 221 may generate compensation data (or first compensation data CDATA1) by performing the second image compensation on the received input image data IDATA, and provide the compensation data (i.e., the first compensation data CDATA1) to the first semiconductor circuit 121. The first semiconductor circuit 121 may generate compensation data (or a third compensation data CDATA3) by performing the first image compensation on the received input image data IDATA, and generate image data DATA, based on the third compensation data CDATA3 and the first compensation data CDATA1 provided from the second semiconductor circuit 221.

According to an embodiment of the inventive concept, an added image compensation may be performed in the second semiconductor circuit 221 according to a change in design of the image controller IC, etc.

In an embodiment of the inventive concept, the image controller IC may receive temperature sensing data TSD from the sensing unit 10, and allow an operation of the second semiconductor circuit 221 to be off, when a sensing temperature of the second semiconductor circuit 221 is equal to or higher than a predetermined temperature, based on the temperature sensing data TSD. The predetermined temperature may be determined based on experiments, and be preset in the image controller IC before the semiconductor package 1000 (or semiconductor packages 1000', 1000") is released. A compensation parameter CP corresponding to the second image compensation performed in the second semiconductor circuit 221 may be stored in the memory unit 321. The image controller IC may generate compensation data (or second compensation data CDATA2) by performing the second image compensation in the first semiconductor circuit 121, using the compensation parameter CP provided from the memory unit 321. The compensation parameter CP may be provided from the second semiconductor circuit 221 to the memory unit 321, to be stored in the memory unit 321. The first semiconductor circuit 121 may generate third compensation data CDATA3 by performing the first image compensation on the received input image data IDATA, and generate image data DATA, based on the third compensation data CDATA3 and the second compensation data CDATA2.

According to an embodiment of the inventive concept, since the second image compensation includes a calculation operation of adding or subtracting the compensation parameter with the input image data IDATA, the second image compensation may be performed in the first semiconductor circuit 121 in a relatively simple manner.

The operation of the image controller IC will be described in detail in conjunction with FIGS. 5A and 5B. As illustrated in FIG. 5A, the sensing temperature of the second semiconductor circuit 221 may be less than the predetermined temperature. As illustrated in FIG. 5B, the sensing temperature of the second semiconductor circuit 221 may be equal to or higher than the predetermined temperature.

The memory unit 321 may receive a compensation parameter CP from the second semiconductor circuit 221, and store the compensation parameter CP. The compensation parameter CP corresponds to a parameter used for calculation of the second image compensation of the second semiconductor circuit 221.

The first semiconductor circuit 121 may include a compensator 1211, a calculator 1212, and a data pass controller 1213.

The data pass controller 1213 may receive temperature sensing data TSD from the sensing unit 10. The temperature sensing data TSD may include sensing temperature data of the second semiconductor circuit 221.

In an embodiment, the data pass controller 1213 may generate a first data pass control signal DPCS1 and a second data pass control signal DPCS2, based on the temperature sensing data TSD, provide the first data pass control signal DPCS1 to the calculator 1212, and provide the second data pass control signal DPCS2 to the second semiconductor circuit 221.

Operations of the second semiconductor circuit 221 and the calculator 1212 in the first semiconductor circuit 121 may be controlled based on the first and second data pass control signals DPCS1 and DPCS2. For example, the operation of the calculator 1212 may be on or off based on the first data pass control signal DPCS1, and the operation of the second semiconductor circuit 221 may be on or off based on the second data pass control signal DPCS2.

According to some embodiments of the inventive concept, as shown in FIG. 5A, when the sensing temperature of the second semiconductor circuit 221 is less than the predetermined temperature, the data pass controller 1213 may provide the calculator 1212 with a first data pass control signal DPCS1_1 for allowing the operation of the calculator 1212 to be off (e.g., the calculator 1212 does not generate second compensation data) and provide the second semiconductor circuit 221 with a second data pass control signal DPCS2_1 for allowing the operation of the second semiconductor circuit 221 to be on, based on the temperature sensing data TSD_1.

The second semiconductor circuit 221 may generate first compensation data CDATA1 by performing the second image compensation on the input image data IDATA. The first compensation data CDATA1 may be provided to the first semiconductor circuit 121 (or the compensator 1211). According to an embodiment of the inventive concept, when the sensing temperature of the second semiconductor circuit 221 is lower than the predetermined temperature, the second semiconductor circuit 221 may generate the first compensation data CDATA1, based on the second data pass control signal DPCS2_1, and the calculator 1212 does not generate second compensation data (i.e., second compensation data CDATA2 which will be described in greater detail in FIG. 5B), based on the first data pass control signal DPCS1_1.

The compensator 1211 may generate compensation data (or third compensation data CDATA3) by performing the first image compensation on the input image data IDATA, and generate and output image data DATA, based on the third compensation data CDATA3 and the first compensation data CDATA1 obtained by performing the second image compensation.

According to some embodiments of the inventive concept, as shown in FIG. 5B, when the sensing temperature of the second semiconductor circuit 221 is equal to or higher than the predetermined temperature, the data pass controller 1213 may provide the calculator 1212 with a first data pass control signal DPCS1_2 for allowing the operation of the calculator 1212 to be on and provide the second semiconductor circuit 221 with a second data pass control signal DPCS2_2 for allowing the operation of the second semiconductor circuit 221 to be off, based on temperature sensing data TSD_2.

The calculator 1212 may receive a compensation parameter CP corresponding to the second image compensation from the memory unit 321, and generate second compensation data CDATA2 by performing the second image compensation on the input image data IDATA. The second compensation data CDATA2 may be provided to the compensator 1211. According to an embodiment of the inventive concept, when the sensing temperature of the second semiconductor circuit 221 is equal to or higher than the predetermined temperature, the second semiconductor circuit 221 does not generate the first compensation data CDATA1, based on the second data pass control signal DPCS2_2. The calculator 1212 may generate the second compensation data CDATA2 based on the first data pass control signal DPCS1_2. Meanwhile, since both the first compensation data CDATA1 and the second compensation data CDATA2 correspond to compensation data obtained by performing the second image compensation on the input image data IDATA, the first compensation data CDATA1 and the second compensation data CDATA2 may substantially correspond to the same compensation data.

The compensator 1211 may generate third compensation data CDATA3 by performing the first image compensation on the input image data IDATA, and generate and output image data DATA, based on the third compensation data CDATA3 and the second compensation data CDATA2 obtained by performing the second image compensation.

As described with reference to FIGS. 2, 3A, 4, 5A, and 5B, the image controller IC, according to some embodiments of the inventive concept, may control the operation of the second semiconductor circuit 221, based on the sensing temperature of the second semiconductor circuit 221. For example, when the sensing temperature of the second semiconductor circuit 221 is equal to or higher than the predetermined temperature, the image controller IC may allow the operation of the second semiconductor circuit 221 to be off, and perform the second image compensation of the second semiconductor circuit 221 in the calculator 1212 in the first semiconductor circuit 121. Accordingly, the resolution increases and the image refresh rate increases, so that the transmission amount or transmission speed of compensation data from the second semiconductor circuit 221 increases. Thus, a failure caused by excessive heat generated in the second semiconductor circuit 221 can be minimized.

According to some embodiments, the image controller IC controls the operation of the second semiconductor circuit 221 by sensing exclusively the temperature of the second semiconductor circuit 221, as illustrated in FIGS. 2, 3A, 4, 5A, and 5B. However, embodiments of the present disclosure are not limited thereto. For example, as described in FIG. 3B, the sensing unit 10' may sense or measure temperatures of the first semiconductor circuit 120 and the memory 320, which respectively correspond to the first semiconductor circuit 121 and the memory unit 321, in addition to the second semiconductor circuit 220 corresponding to the second semiconductor circuit 221. Accordingly, the image controller IC controls the operations of the first semiconductor circuit 121 (or the calculator 1212) and the second semiconductor circuit 221 by considering all temperatures of the first semiconductor circuit 121, the second semiconductor circuit 221, and the memory unit 321, so that a failure caused by heat generation can be more effectively minimized. In one embodiment of the inventive concept, the first semiconductor circuit 121 may determine whether the operation of the second semiconductor circuit is to be off, based on a sensing temperature of the first semiconductor circuit 121, a sensing temperature of the second semiconductor circuit 221, and a sensing temperature of the memory unit 321.

Figure 6:
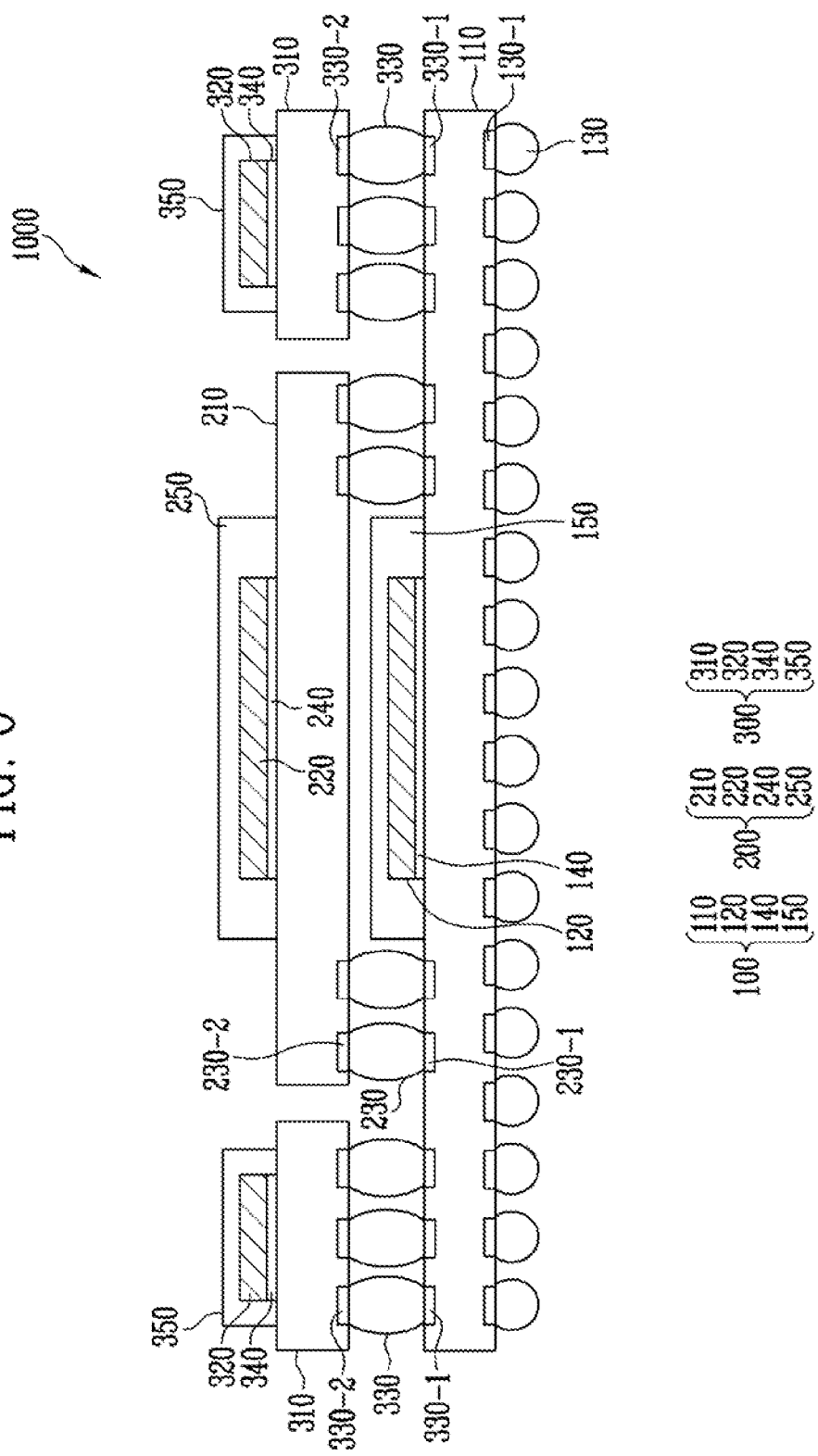
FIG. 6 is a diagram illustrating in more detail the semiconductor package shown in FIG. 2.

FIG. 6 is a diagram describing in greater detail regarding the semiconductor package shown in FIG. 2.

Referring to FIGS. 4 and 6, the semiconductor package 1000 may include a first package 100, a second package 200, and a third package 300. Also, the semiconductor package 1000 may include connection members 130, 230, and 330. The semiconductor package 1000 may have a POP structure in which the second package 200 is stacked above the first package 100 as shown in FIG. 6.

The first package 100 may include a first substrate 110, a first semiconductor circuit 120 formed on the first substrate 110, an adhesive 140, and a sealant 150. Pads may be formed at a bottom surface and a top surface of the first substrate 110. For example, lower pads 130-1 may be formed at the bottom surface of the first substrate 110, and first upper pads 230-1 and second upper pads 330-1 may be formed at the top surface of the first substrate 110. The first substrate 110 may be formed of silicon, glass, ceramic, plastic or the like. However, this is merely illustrative, and the material of the first substrate 110 is not limited thereto.

The first substrate 110 may be formed based on an active wafer or an interposer substrate. The active wafer may be a wafer, such as a silicon wafer, on which a semiconductor circuit can be formed. Also, the first substrate 110 may include a multi-layered structure in which line patterns are formed therein. The first upper pads 230-1 and the second upper pads 330-1 may be electrically connected to the lower pads 130-1 through the line patterns. Meanwhile, external connection members 130 for allowing the semiconductor package 1000 to be mounted on an external board such as a main board therethrough may be formed on the lower pads 130-1 at the bottom surface of the first substrate 110. The first package 100 (or the first semiconductor circuit 121) may receive input image data IDATA and output image data DATA through the lower pads 130-1 and the external connection members 130.

The first semiconductor circuit 120 may be attached and fixed to the first substrate 110 through the adhesive 140. The adhesive 140 may be, for example, an NCF, a UV film, an instant adhesive, a thermosetting adhesive, a laser curable adhesive, an ultrasound curable adhesive, an NCP, etc.

In addition, chip pads may be respectively formed in the first semiconductor circuit 120 and the first substrate 110, and wires connecting the chip pads may be formed. The first semiconductor circuit 120 and the first substrate 110 are electrically connected by the chip pads and the wires, so that necessary signals (e.g., the input image data IDATA, the output image data DATA, and the like) can be transmitted therebetween.

The sealant 150 may seal the first semiconductor circuit 120 and the wires electrically connecting the first semiconductor circuit 120 and the first substrate 110. The sealant 150 may be formed of polymer such as resin. For example, the sealant 150 may be formed of an Epoxy Molding Compound (EMC).

The second package 200 may include a second substrate 210, a second semiconductor circuit 220 formed on the second substrate 210, an adhesive 240, and a sealant 250. Pads may be formed at a bottom surface of the second substrate 210. For example, first connection pads 230-2 may be formed at the bottom surface of the second substrate 210. First connection members 230 for electrically connecting the first package 100 and the second package 200 may be formed on the first connection pads 230-2 at the bottom surface of the second substrate 210.

The first connection members 230 may allow the first upper pads 230-1 of the first substrate 110 and the first connection pads 230-2 of the second substrate 210 to be physically and electrically connected to each other, and the first connection members 230 may be configured to structurally fix the first package 100 and the second package 200 in a firm manner. For example, the first substrate 110 may be spaced apart from the second substrate 210, but the first substrate 110 may be connected to the second substrate 210 through the first upper pads 230-1, the first connection members 230, and the first connection pads 230-2. Material of the first connection members 230 may include, for example, a solder ball. However, the material of the first connection member 230 is not limited to solder. For example, the first connection member 230 may include at least one of tin (Sn), silver (Ag), copper (Cu), and aluminum (Al), or an alloy of these, in addition to the solder. Also, the structure of the first connection members 230 is not limited to a ball shape as shown in the figures. For example, the first connection members 230 may be variously modified such as a cylindrical shape, a polygonal pillar shape, and a polyhedral shape. According to an embodiment of the inventive concept, the first connection members 230 or the material of the first connection members 230 may include one or more solder balls (e.g., three solder balls, etc.). For example, the first connection members 230 may be formed in a structure in which a lower solder ball and an upper solder ball are coupled to each other.

The first package 100 and the second package 200 may transmit signals (e.g., the input image data IDATA, the image data DATA, and the like) therebetween through the pads 230-1 and 230-2 and the first connection members 230.

Similar to the first substrate 110, the second substrate 210 may be formed of silicon, glass, ceramic, plastic or the like. However, this is merely illustrative, and the material of the second substrate 210 is not limited thereto.

Similar to the first substrate 110, the second substrate 210 may also include a multi-layered structure in which line patterns are formed therein.

The second semiconductor circuit 220 may be attached and fixed to the second substrate 210 through the adhesive 240. The adhesive 240 may be, for example, an NCF, a UV film, an instant adhesive, a thermosetting adhesive, a laser curable adhesive, an ultrasound curable adhesive, an NCP, etc.

In addition, chip pads may be respectively formed in the second semiconductor circuit 220 and the second substrate 210, and wires connecting the chip pads may be formed. The second semiconductor circuit 220 and the second substrate 210 are electrically connected by the chip pads and the wires, so that signals (e.g., the input image data IDATA, the image data DATA, and the like) can be transmitted therebetween.

The sealant 250 may seal the second semiconductor circuit 220 and the wires electrically connecting the second semiconductor circuit 220 and the second substrate 210. The sealant 250 may be formed of polymer such as resin. For example, the sealant 250 may be formed of an Epoxy Molding Compound (EMC).

The third package 300 may include a third substrate 310, a memory 320 formed on the third substrate 310, an adhesive 340, and a sealant 350. For example, second connection pads 330-2 may be formed at a bottom surface of the third substrate 310. Second connection members 330 may be configured to electrically connect the first package 100 and the third package 300, and the second connection members 330 may be formed on the second connection pads 330-2 disposed at the bottom surface of the third substrate 310.

The second connection members 330 may allow the second upper pads 330-1 of the first substrate 110 and the second connection pads 330-2 of the third substrate 310 to be physically and electrically connected to each other. The second connection members 330 are configured to structurally fix the first package 100 and the third package 300 in a firm manner. In this way, the first package 100 and the third package 300 may be connected or attached to each other through the second connection members 330 firmly. The second connection members 330 may include, for example, at least a solder ball. However, the material of the second connection members 330 is not limited to solder (e.g., a metal alloy). For example, the second connection members 330 may include at least one of tin (Sn), silver (Ag), copper (Cu), and aluminum (Al), or an alloy of these, in addition to the solder. Furthermore, the structure of the second connection members 330 is not limited to a ball shape as shown in the FIG. 6. For example, the second connection members 330 may be variously modified such that they may have a cylindrical shape, a polygonal pillar shape, and a polyhedral shape. In addition, the second connection members 330 may be formed of or may include one or more solder balls. For example, the second connection members 330 may be formed in a structure in which a lower solder ball and an upper solder ball are coupled to each other.

The first package 100 and the third package 300 may transmit signals (e.g., a compensation parameter CP and the like) therebetween through the pads 330-1 and 330-2 and the second connection members 330.

Similar to the first substrate 110, the third substrate 310 may be formed of silicon, glass, ceramic, plastic or the like. However, this is merely illustrative, and the material of the third substrate 310 is not limited thereto.

Similar to the first substrate 110, the third substrate 310 may include a multi-layered structure in which line patterns are formed therein.

The memory 320 may be attached and fixed to the third substrate 310 through the adhesive 340. The adhesive 340 may be, for example, an NCF, a UV film, an instant adhesive, a thermosetting adhesive, a laser curable adhesive, an ultrasound curable adhesive, an NCP, etc.

In addition, chip pads may be respectively formed in the memory 320 and the third substrate 310, and wires connecting the chip pads may be formed. The memory 320 and the third substrate 310 are electrically connected by the chip pads and the wires, so that signals (e.g., the compensation parameter CP and the like) can be transmitted therebetween.

The sealant 350 may seal the memory 320 and the wires electrically connecting the memory 320 and the third substrate 310. The sealant 350 may be formed of polymer such as resin. For example, the sealant 350 may be formed of an Epoxy Molding Compound (EMC).

In FIG. 6, the first package 100 and the second package 200 respectively include one semiconductor circuits 120 and 220, this is merely an example, and at least one of the first package 100 and the second package 200 may include a plurality of semiconductor circuits.

In addition, communication between the packages 100, 200, and 300 may be performed through the connection members 130, 230, and 330. Such communication may also be implemented as optical communication or communication using magnetic coupling. The communication using the magnetic coupling is a communication form in which data is communicated by using magnetism without relying on any physical connection means, and the optical communication is a communication form using an optical cable, a photodiode, and a laser diode.

Figure 7:
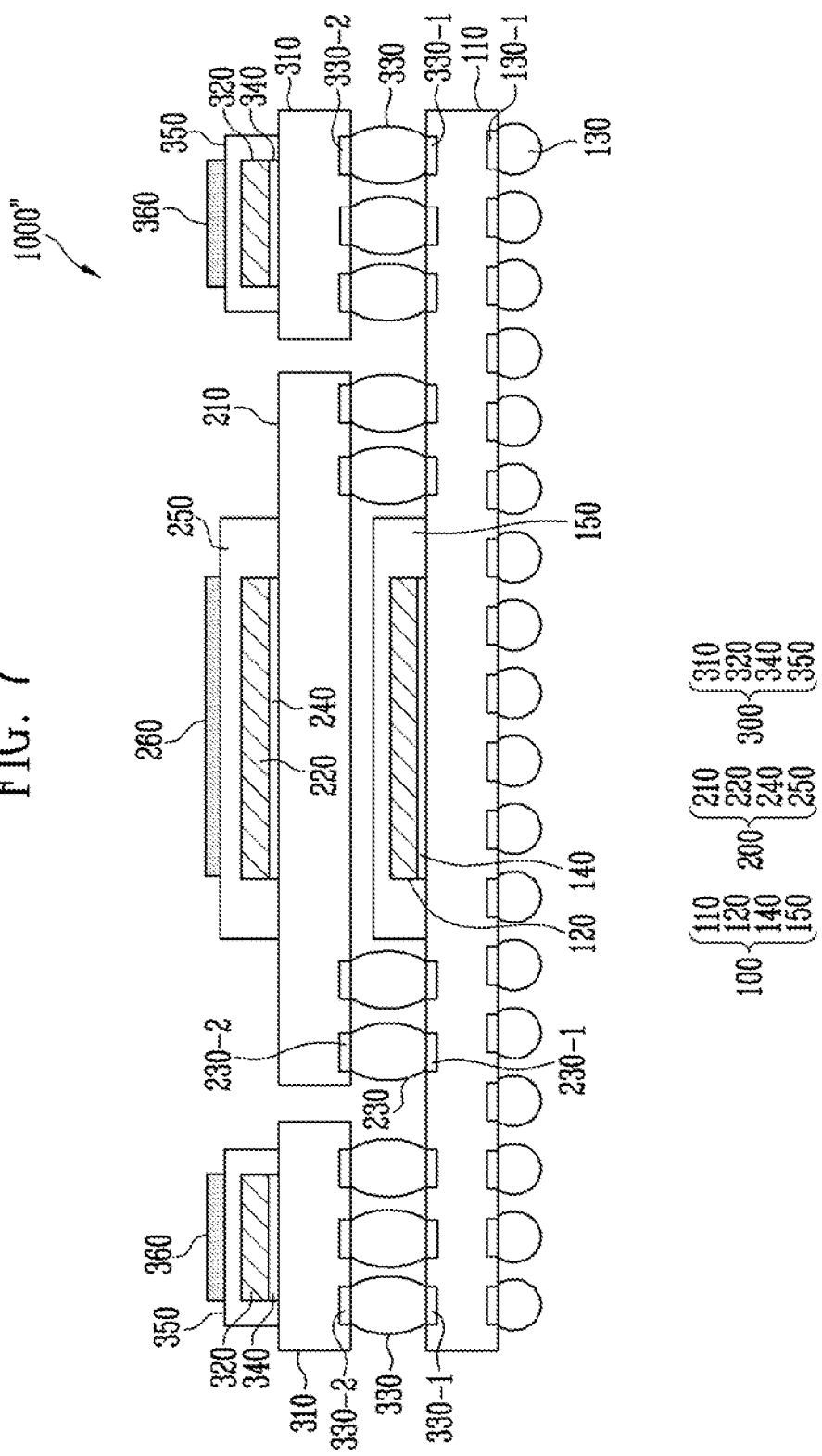
FIG. 7 is a diagram illustrating a semiconductor package in accordance with embodiments of the present disclosure.

FIG. 7 is a diagram illustrating a semiconductor package in accordance with embodiments of the present disclosure.

Referring to FIGS. 6 and 7, a semiconductor package 1000" shown in FIG. 7 is substantially similar to the semiconductor package 1000 shown in FIG. 6. According to an embodiment of the inventive concept, the semiconductor package 1000" further includes heat dissipation members 260 and 360. However, repetitive descriptions of same elements will be omitted. To the extent that a description of an element has been omitted, it may be assumed that the description is at least similar to that of corresponding elements that have been described elsewhere in the instant specification.

Referring to FIGS. 3A, 3B, 4, and 7, the semiconductor package 1000" may include a first package 100, a second package 200, and a third package 300. Also, the semiconductor package 1000" may further include the heat dissipation members 260 and 360. The heat dissipation members 260 and 360 may be formed and disposed on a top surface of at least one of the second package 200 and the third package 300. The heat dissipation members 260 and 360 may be configured with a heat dissipation plate, and radiate heat generated in the second package 200 and/or the third package 300 to the outside (e.g., external environment).

The semiconductor package 1000" receives temperature sensing data TSD from the sensing unit 10 or 10', and increases a heat dissipation speed of the heat dissipation members 260 and 360, when a sensing temperature of the second package 200 and/or the third package 300 is equal to or higher than a predetermined temperature, so that a heat dissipation performance can be increased. Accordingly, a failure caused by heat generation can be more effectively minimized (e.g., excessive heat generated in a semiconductor circuit in the image controller IC).

In the image controller and the semiconductor package implementing the image controller, when a temperature of a semiconductor circuit is sensed or measured, and the measured temperature is equal to or higher than a predetermined temperature, an operation of the corresponding semiconductor circuit is off, and input image data is compensated by using a memory for temporarily processing a compensation parameter, therefore, a failure caused by excessive heat generated from the corresponding semiconductor circuit can be minimized.

While the inventive concept has been particularly shown and described with reference to the example embodiments thereof, it will be understood by one of ordinary skill in the art that variations in form and detail may be made therein without departing from the spirit and scope of the inventive concept.

What is claimed is:

1. An image controller, comprising:
a first semiconductor circuit configured to generate a third compensation data obtained by applying a first image compensation to an input image data;
a second semiconductor circuit configured to generate a first compensation data obtained by applying a second image compensation different from the first image compensation to the input image data; and
a sensing unit configured to generate a temperature sensing data by measuring a temperature of the second semiconductor circuit,
wherein the first semiconductor circuit determines whether an operation of the second semiconductor circuit is to be off based on the temperature sensing data,
wherein the first semiconductor circuit:
generates an image data, based on the first compensation data and the third compensation data when the measured temperature of the second semiconductor circuit is lower than a predetermined temperature; and
allows the operation of the second semiconductor circuit to be off, generates a second compensation data obtained by applying the second image compensation to the input image data, and generates the image data based on the second compensation data and the third compensation data when the measured temperature of the second semiconductor circuit is equal to or higher than the predetermined temperature.

2. The image controller of claim 1, further comprising a memory unit configured to store a compensation parameter corresponding to the second image compensation.

3. The image controller of claim 2, wherein the first semiconductor circuit generates the second compensation data by applying the compensation parameter to the input image data.

4. The image controller of claim 2, wherein the compensation parameter stored in the memory unit is provided from the second semiconductor circuit.

5. The image controller of claim 2, wherein the sensing unit generates the temperature sensing data by further measuring temperature of the first semiconductor circuit and temperature of the memory unit.

6. The image controller of claim 5, wherein the first semiconductor circuit determines whether the operation of the second semiconductor circuit is to be off, based on the measured temperature of the first semiconductor circuit, the measured temperature of the second semiconductor circuit, and the measured temperature of the memory unit.

7. The image controller of claim 1, wherein the first semiconductor circuit includes:
a compensator configured to generate the third compensation data based on the input image data;
a calculator configured to generate the second compensation data based on the input image data and a compensation parameter; and
a data pass controller configured to generate a first data pass control signal for controlling the calculator and a second data pass control signal for controlling the second semiconductor circuit, based on the temperature sensing data.

8. The image controller of claim 7, wherein, when the measured temperature of the second semiconductor circuit is equal to or higher than the predetermined temperature, the second semiconductor circuit is prevented from generating the first compensation data, and the calculator generates the second compensation data, based on the first data pass control signal.

9. The image controller of claim 7, wherein the compensator generates the image data, based on the second compensation data and the third compensation data.

10. The image controller of claim 7, wherein, when the measured temperature of the second semiconductor circuit is lower than the predetermined temperature, the second semiconductor circuit generates the first compensation data, based on the second data pass control signal, and the calculator is prevented from generating the second compensation data, based on the first data pass control signal.

11. The image controller of claim 7, wherein the compensator generates the image data, based on the first compensation data and the third compensation data.

12. A semiconductor package, comprising:
- a first package including a first semiconductor circuit configured to generate a third compensation data obtained by applying a first image compensation to an input image data;
- a second package including a second semiconductor circuit configured to generate a first compensation data obtained by applying a second image compensation different from the first image compensation to the input image data, the second package being disposed above the first package; and
- at least one thermal sensor disposed in a predetermined sensing area on the second semiconductor circuit and configured to measure a temperature of the second semiconductor circuit,
- wherein the first semiconductor circuit determines whether an operation of the second semiconductor circuit is to be off, based on the temperature of the second semiconductor circuit, which is measured by the at least one thermal sensor,
- wherein the first semiconductor circuit:
    - generates image data based on the first compensation data and the third compensation data when the temperature of the second semiconductor circuit, which is measured by the at least one thermal sensor, is lower than a predetermined temperature; and
    - allows the operation of the second semiconductor circuit to be off, generates a second compensation data obtained by applying the second image compensation to the input image data, and generates the image data based on the second compensation data and the third compensation data, when the temperature of the second semiconductor circuit, which is measured by the at least one thermal sensor, is equal to or higher than the predetermined temperature.

13. The semiconductor package of claim 12, further comprising a third package including a memory configured to store a compensation parameter corresponding to the second image compensation, the third package being disposed above the first package.

14. The semiconductor package of claim 13, wherein the first package further includes a first substrate supporting the first semiconductor circuit, the first substrate being electrically connected to the first semiconductor circuit, and
- the third package further includes a third substrate supporting the memory, the third package being electrically connected to the memory, and
- wherein the first substrate and the third substrate are electrically connected to each other through at least one connection member.

15. The semiconductor package of claim 13, further comprising at least one heat dissipation member disposed on a top surface of at least one of the second package and the third package.

16. The semiconductor package of claim 12, wherein the first package further includes a first substrate supporting the first semiconductor circuit, the first substrate being electrically connected to the first semiconductor circuit, and
- the second package further includes a second substrate supporting the second semiconductor circuit, the second substrate being electrically connected to the second semiconductor circuit, and
- wherein the first substrate and the second substrate are electrically connected to each other through at least one connection member.

17. The semiconductor package of claim 16, wherein the at least one thermal sensor is disposed between the second semiconductor circuit and the second substrate.

18. A semiconductor package, comprising:
- a first package including a first semiconductor circuit configured to generate a third compensation data obtained by applying a first image compensation to an input image data;
- a second package including a second semiconductor circuit configured to generate a first compensation data obtained by applying a second image compensation different from the first image compensation to the input image data, the second package being disposed above the first package;
- at least one thermal sensor configured to measure a temperature of the second semiconductor circuit; and
- a third package including a memory configured to store a compensation parameter corresponding to the second image compensation, the third package being disposed above the first package,
- wherein the first semiconductor circuit includes:
    - a compensator configured to generate the third compensation data based on the input image data; and
    - a calculator configured to generate a second compensation data based on the input image data and the compensation parameter,
- wherein the first semiconductor circuit determines whether an operation of the calculator is to be off based on the measured temperature of the second semiconductor circuit,
- wherein, based on the determination, the calculator is prevented from generating the second compensation data,
- wherein the compensator generates an image data based on the first compensation data and the third compensation data, and
- wherein the third package includes a substrate supporting the memory, and the substrate being electrically connected to the memory.

* * * * *